(12) United States Patent
Hill et al.

(10) Patent No.: US 8,870,046 B2
(45) Date of Patent: Oct. 28, 2014

(54) METHODS AND APPARATUS FOR MANAGING STRESS IN GLASS RIBBONS

(75) Inventors: Keith Mitchell Hill, Horseheads, NY (US); Tung Thanh Nguyen, Buon Me Thuot (VN); Naiyue Zhou, Painted Post, NY (US); Zepei Zhu, Corning, NY (US)

(73) Assignee: Corning Incorporated, Corning, NY (US)

( * ) Notice: Subject to any disclaimer, the term of this patent is extended or adjusted under 35 U.S.C. 154(b) by 252 days.

(21) Appl. No.: 13/307,391

(22) Filed: Nov. 30, 2011

(65) Prior Publication Data

US 2013/0134198 A1     May 30, 2013

(51) Int. Cl.
*B26F 3/00* (2006.01)

(52) U.S. Cl.
USPC .................................. 225/2; 225/96; 225/97

(58) Field of Classification Search
USPC ........... 65/25.3, 105, 97, 112, 174; 225/2, 96, 225/97, 96.5, 94, 4; 83/879, 880
See application file for complete search history.

(56) References Cited

U.S. PATENT DOCUMENTS

| | | | | |
|---|---|---|---|---|
| 3,338,696 | A | 8/1967 | Dockerty | 65/145 |
| 3,682,609 | A | 8/1972 | Dockerty | 65/83 |
| 3,883,338 | A * | 5/1975 | Stingelin | 65/91 |
| 4,511,387 | A | 4/1985 | Kellar et al. | 65/287 |
| 6,311,523 | B1 * | 11/2001 | Kojima et al. | 65/25.3 |
| 7,213,414 | B2 | 5/2007 | Shiraishi et al. | 65/25.3 |
| 7,260,959 | B2 * | 8/2007 | Chang et al. | 65/25.3 |
| 7,934,392 | B2 * | 5/2011 | Greulich-Hickmann et al. | 65/101 |
| 2006/0010915 | A1 * | 1/2006 | Greulich-Hickmann et al. | 65/25.3 |
| 2006/0042314 | A1 * | 3/2006 | Abbott et al. | 65/25.3 |
| 2006/0042315 | A1 * | 3/2006 | Chang et al. | 65/25.3 |
| 2008/0276646 | A1 | 11/2008 | Chalk et al. | 65/17.2 |
| 2011/0167873 | A1 | 7/2011 | Anderson et al. | 65/91 |
| 2011/0265519 | A1 | 11/2011 | Delia et al. | 65/97 |
| 2012/0047951 | A1 * | 3/2012 | Dannoux et al. | 65/25.3 |
| 2012/0159989 | A1 | 6/2012 | Shiraishi et al. | 65/25.3 |

FOREIGN PATENT DOCUMENTS

WO    WO 2007/053265      5/2007       C03B 37/02

OTHER PUBLICATIONS

PCT Search Report dated Mar. 25, 2013.

* cited by examiner

*Primary Examiner* — Omar Flores Sanchez
(74) *Attorney, Agent, or Firm* — Matthew J. Mason; Christopher W. Elswick; Kevin M. Able

(57) ABSTRACT

A device for engaging and tensioning a glass ribbon includes a center frame member, and first and second outer frame members connected thereto. The first outer frame member includes a suction cup that engages an edge area of the glass ribbon and an actuator for moving the suction cup of the first outer frame member. The second outer frame member includes a suction cup that engages an opposite edge area of the glass ribbon and an actuator for moving the suction cup of the second outer frame member. The actuators of the first and second outer frame members moves the suction cups of the respective frame members in directions away from each other.

14 Claims, 4 Drawing Sheets

METHODS AND APPARATUS FOR
MANAGING STRESS IN GLASS RIBBONS

FIELD

The present specification generally relates to the manufacture of glass sheets such as the glass sheets used as substrates in display devices such as liquid crystal displays (LCDs) and, more particularly to methods for managing stress in glass ribbons.

BACKGROUND

When a glass ribbon (e.g., for a liquid crystal display (LCD) glass sheet) is manufactured, a robot tooling is often used in handling the glass ribbon in a glass manufacturing facility. The robot tooling typically has an end effector which uses suction cups to engage and hold outside edges or non-quality areas of the glass ribbon. The suction cups engage the glass ribbon on the outer edges because if they contact the glass sheet in the center portion or the quality area then unacceptable defects and/or contamination may be created in the glass sheet.

SUMMARY

Several aspects of the present invention are disclosed herein. It is to be understood that these aspects may or may not overlap with one another. Thus, part of one aspect may fall within the scope of another aspect, and vice versa.

Each aspect is illustrated by a number of embodiments, which in turn, can include one or more specific embodiments. It is to be understood that the embodiments may or may not overlap with each other. Thus, part of one embodiment, or specific embodiments thereof, may or may not fall within the ambit of another, or specific embodiments thereof, and vice versa.

Thus, a first aspect of the present disclosure is related to a device for engaging and tensioning a glass ribbon, comprising:

a center frame member;

a first outer frame member connected to the center frame member, the first outer frame member including a suction cup that engages an edge area of the glass ribbon and an actuator for moving the suction cup of the first outer frame member; and a second outer frame member connected to the center frame member, the second outer frame member including a suction cup that engages an opposite edge area of the glass ribbon and an actuator for moving the suction cup of the second outer frame member;

wherein the actuator of the first outer frame member moves the suction cup of the first outer frame member in a direction away from the suction cup of the second outer frame member and the actuator of the second outer frame member moves the suction cup of the second outer frame member in a direction away from the suction cup of the first outer frame member.

In certain embodiments of the first aspect of the present disclosure, the first outer frame member comprises a plurality of suction cups that engage the edge area of the glass ribbon and the second outer frame member comprises a plurality of suction cups that engage the opposite edge area of the glass ribbon.

In certain embodiments of the first aspect of the present disclosure, the first outer frame member comprises a plurality of actuators, where each actuator of the first outer frame member is connected to a respective suction cup of the plurality of suction cups of the first outer frame member.

In certain embodiments of the first aspect of the present disclosure, the second outer frame member comprises a plurality of actuators, where each actuator of the second outer frame member is connected to a respective suction cup of the plurality of suction cups of the first outer frame member.

In certain embodiments of the first aspect of the present disclosure, the actuator is an air cylinder, such as low friction air cylinder, which can apply constant force.

In certain embodiments of the first aspect of the present disclosure, the actuators of the first outer frame member and the second outer frame member supply a force of between about 7 and about 10 lbs when tensioning the glass ribbon. This force range is an example and actual applicable range can be wider.

A second aspect of the present disclosure relates to a method for engaging and tensioning a glass ribbon, the method comprising:

engaging the glass ribbon using an end effector of a robot tooling, the end effector comprising:

a center frame member;

a first outer frame member connected to the center frame member, the first outer frame member including a suction cup engaging an edge area of the glass ribbon and an actuator for moving the suction cup of the first outer frame member; and a second outer frame member connected to the center frame member, the second outer frame member including a suction cup engaging an opposite edge area of the glass ribbon and an actuator for moving the suction cup of the second outer frame member;

applying a first tensioning force to the glass ribbon at the suction cup of the first outer frame member by actuating the actuator of the first outer frame member; and applying a second tensioning force to the glass ribbon at the suction cup of the second outer frame member by actuating the actuator of the second outer frame member.

In certain embodiments of the second aspect of the present disclosure, the first tensioning force and the second tensioning force have about the same magnitude.

In certain embodiments of the second aspect of the present disclosure, the first tensioning force is in a direction that is opposite a direction of the second tensioning force.

In certain embodiments of the second aspect of the present disclosure, at least one of the first tensioning force and the second tensioning force is between about 7 and about 10 lbs. This force range is an example and actual applicable range can be wider.

In certain embodiments of the second aspect of the present disclosure, the first outer frame member comprises a plurality of suction cups engaging the edge area of the glass ribbon and the second outer frame member comprises a plurality of suction cups engaging the opposite edge area of the glass ribbon.

In certain embodiments of the second aspect of the present disclosure, the first outer frame member comprises a plurality of actuators, where each actuator of the first outer frame member is connected to a respective suction cup of the plurality of suction cups of the first outer frame member.

In certain embodiments of the second aspect of the present disclosure, the second outer frame member comprises a plurality of actuators, where each actuator of the second outer frame member is connected to a respective suction cup of the plurality of suction cups of the first outer frame member.

In certain embodiments of the second aspect of the present disclosure, the actuator is an air cylinder, such as a low friction air cylinder, which can apply a constant force.

A third aspect of the present disclosure relates to a glass manufacturing system, comprising:
- a melting vessel that melts batch materials and forms molten glass;
- a forming vessel that receives the molten glass to form a glass ribbon;
- a draw machine that draws the glass ribbon;
- a cutting device that cuts the glass ribbon to form a discrete sheet; and
- a robot tooling comprising an end effector that engages and tensions the glass ribbon by applying opposed forces to the glass ribbon in a direction substantially transverse to a centerline of the glass ribbon, the end effector comprising:
  - a center frame member;
  - a first outer frame member connected to the center frame member, the first outer frame member including a suction cup engaging an edge area of the glass ribbon and an actuator for moving the suction cup of the first outer frame member; and
  - a second outer frame member connected to the center frame member, the second outer frame member including a suction cup engaging an opposite edge area of the glass ribbon and an actuator for moving the suction cup of the second outer frame member.

In certain embodiments of the third aspect of the present disclosure, the first outer frame member comprises a plurality of suction cups that engage the edge area of the glass ribbon and the second outer frame member comprises a plurality of suction cups that engage the opposite edge area of the glass ribbon.

In certain embodiments of the third aspect of the present disclosure, the first outer frame member comprises a plurality of actuators, where each actuator of the first outer frame member is connected to a respective suction cup of the plurality of suction cups of the first outer frame member.

In certain embodiments of the third aspect of the present disclosure, the second outer frame member comprises a plurality of actuators, where each actuator of the second outer frame member is connected to a respective suction cup of the plurality of suction cups of the first outer frame member.

In certain embodiments of the third aspect of the present disclosure, the actuator is an air cylinder, such as a low friction air cylinder, which can apply a constant force.

In certain embodiments of the third aspect of the present disclosure, the actuators of the first outer frame member and the second outer frame member supply a force of between about 7 and about 10 lbs when tensioning the glass ribbon.

A fourth aspect of the present disclosure relates to a method for making a glass sheet comprising the following steps:
- (A) forming a glass ribbon in a viscoelastic state;
- (B) drawing the glass ribbon in a viscoelastic state;
- (C) cooling the glass ribbon in the viscous state into an elastic state;
- (D) engaging the glass ribbon using an end effector of a robot tooling, the end effector comprising:
  - a center frame member;
  - a first outer frame member connected to the center frame member, the first outer frame member including a suction cup engaging an edge area of the glass ribbon and an actuator for moving the suction cup of the first outer frame member; and
  - a second outer frame member connected to the center frame member, the second outer frame member including a suction cup engaging an opposite edge area of the glass ribbon and an actuator for moving the suction cup of the second outer frame member;
- (E) applying a first tensioning force to the glass ribbon at the suction cup of the first outer frame member by actuating the actuator of the first outer frame member;
- (F) applying a second tensioning force to the glass ribbon at the suction cup of the second outer frame member by actuating the actuator of the second outer frame member;
- (G) scoring the glass ribbon in the elastic state along a line transversal to the direction in which the glass ribbon is drawn to form a transversal score-line; and
- (H) after step (D) and (G), separating a glass sheet from the glass ribbon along the transversal score-line.

In certain embodiments of the fourth aspect of the present disclosure, steps (E) and (F) are carried out substantially simultaneously, and the first tensioning force and the second tensioning force are substantially equal in magnitude and opposite in direction.

In certain embodiments of the fourth aspect of the present disclosure, step (H) comprises bending the glass ribbon along the transversal score-line using the end-effector.

In certain embodiments of the fourth aspect of the present disclosure, step (A) comprises a step of fusion down-draw, slot down-draw, or redraw down-draw.

In certain embodiments of the fourth aspect of the present disclosure, the first tensioning force and the second tensioning force are from 7 lb to 10 lb.

In certain embodiments of the fourth aspect of the present disclosure, before step (D), the glass ribbon in the elastic state above the score-line is further restrained in the peripheral regions of both sides by edge restraining devices.

Additional features and advantages of the glass substrates and methods for producing the glass substrates will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

DETAILED DESCRIPTION

Corning Inc. has developed a process known as the fusion process (e.g., downdraw process) which forms high quality thin glass sheets that can be used in a variety of devices like flat panel displays. The fusion process is a technique for producing glass sheets that are used in flat panel displays because these glass sheets have surfaces with superior flatness and smoothness when compared to glass sheets produced by other methods. A glass manufacturing system 100 that uses the fusion process to make a glass sheet is briefly described below but for a more detailed description about the fusion process reference is made to U.S. Pat. Nos. 3,338,696 and 3,682,609. The contents of these patents are incorporated herein by reference.

Figure 1:
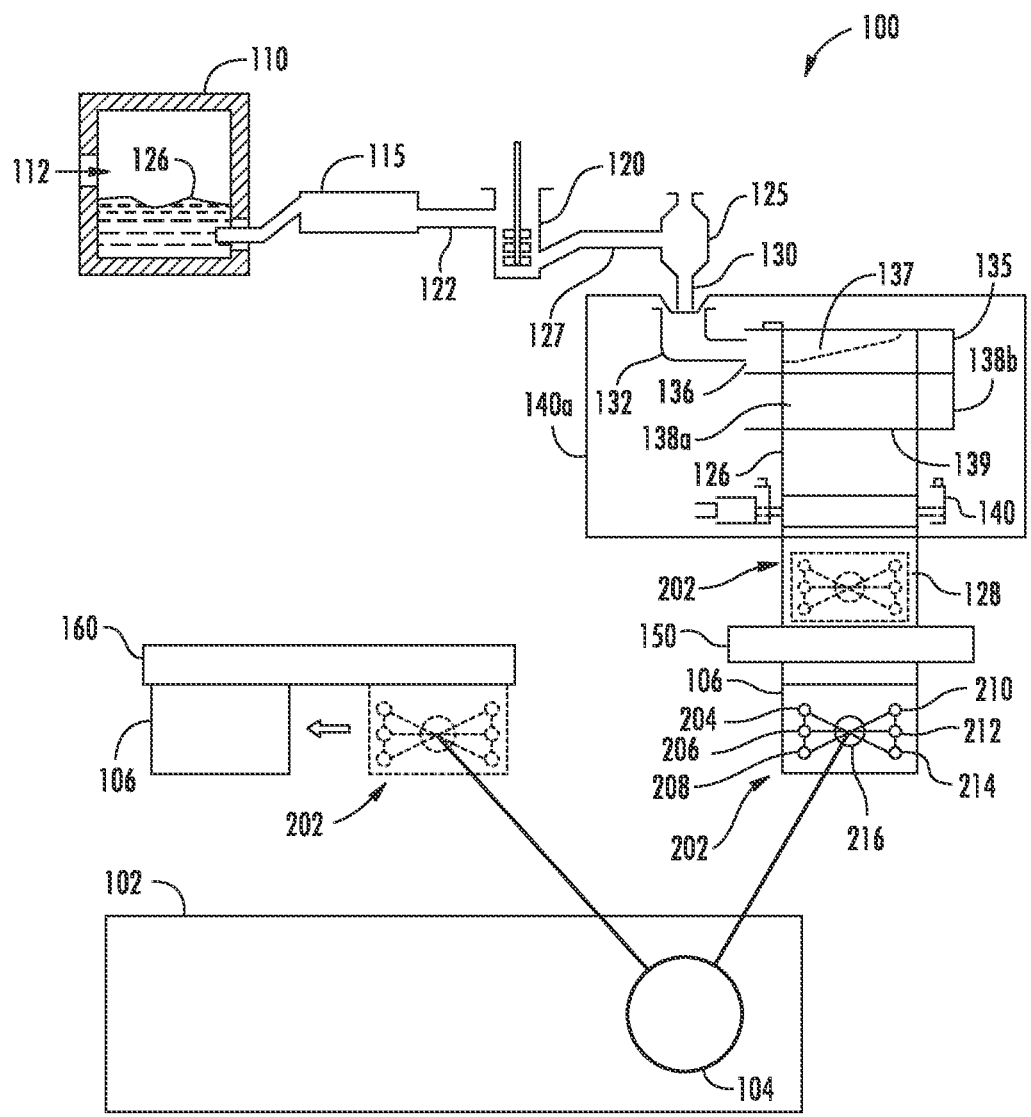
FIG. 1 is a diagrammatic illustration of an embodiment of a glass manufacturing system.

Referring to FIG. 1, there is shown a diagram of an exemplary glass manufacturing system 100 that uses a fusion process and glass handling system 102 to make a glass sheet 106. As shown, the glass manufacturing system 100 includes a melting vessel 110, a fining vessel 115, a mixing vessel 120 (e.g., a stir chamber), a delivery vessel 125 (e.g., a bowl), a fusion draw machine (FDM) 140a, a traveling anvil machine (TAM) 150, a conveyor 160 and the glass handling system 102. The melting vessel 110 is where the glass batch materials are introduced as shown by arrow 112 and melted to form molten glass 126. The fining vessel 115 (e.g., a finer tube) has a high temperature processing area that receives the molten glass 126 from the melting vessel 110 and in which bubbles are removed from the molten glass 126. The fining vessel 115 is connected to the mixing vessel 120 (e.g., a stir chamber) by a finer to stir chamber connecting tube 122. The mixing vessel 120 is connected to the delivery vessel 125 by a stir chamber to a bowl connecting tube 127. The delivery vessel 125 delivers the molten glass 126 through a downcomer 130 into the FDM 140a which includes an inlet 132, a forming vessel 135 (e.g., an isopipe), and a pull roll assembly 140. As shown, the molten glass 126 from the downcomer 130 flows into an inlet 132 which leads to the forming vessel 135. The forming vessel 135 includes an opening 136 that receives the molten glass 126 which flows into a trough 137 and then overflows and runs down two sides 138a and 138b before fusing together at what is known as a root 139. The root 139 is where the two sides 138a and 138b come together and where the two overflow walls of molten glass 126 rejoin (e.g., refuse) to form a glass ribbon 128 before being drawn downward by the pull roll assembly 140 and edge restraining devices to form the glass sheet 105. The TAM 150 cuts the drawn glass ribbon 128 into distinct pieces of glass sheets 106. At this point, the glass sheet 106 is hot, significantly above room temperature. The glass handling system 102 including a robot tooling 104 engages the cut glass sheet 106 and moves the glass sheet 106 from the TAM 150 to the conveyor 160 which is located in a Bottom of the Draw (BOD) area. This area is referred to as the Hot BOD (HBOD) as the glass sheet 106 is still hot. The conveyor 160 then conveys the glass sheet 106 which cools along the way through a couple of process steps. At the end of the conveyor 160 which is referred to as the Cold End, the glass sheet 106 is packaged along with other glass sheets 106 so they can be sent for edge finishing or to customers.

As indicated by the dotted lines, the robot tooling 104 may engage the glass ribbon 128 prior to or upstream of the TAM 150 and the glass scoring and breaking operations at the TAM 150. As will be described, the robot tooling 140 may include an end effector 202 that includes suction cups 204, 206, 208, 210, 212 and 214 (e.g., vacuum suction cups) that are used to engage the glass ribbon 128. The suction cups 204, 206, 208, 210, 212 and 214 contact and support the outer edges or the non-quality area of the vertically oriented glass ribbon 128. In some embodiments, the end effector 202 may further include an aero-mechanical device 216. The aero-mechanical device 216 may receive a gas from a gas supply unit and emit the gas toward the center portion or quality area of the glass ribbon 128 in a manner which enables the aero-mechanical device 216 to support and hold the center portion of the glass ribbon 128 without contacting the quality area of the glass ribbon 128. It should be noted that while six suction cups 204, 206, 208, 210, 212 and 214 are illustrated three on each side, more or less than six suction cups may be used. For example, two, four, eight, ten or more suction cups may be used.

Figure 2:
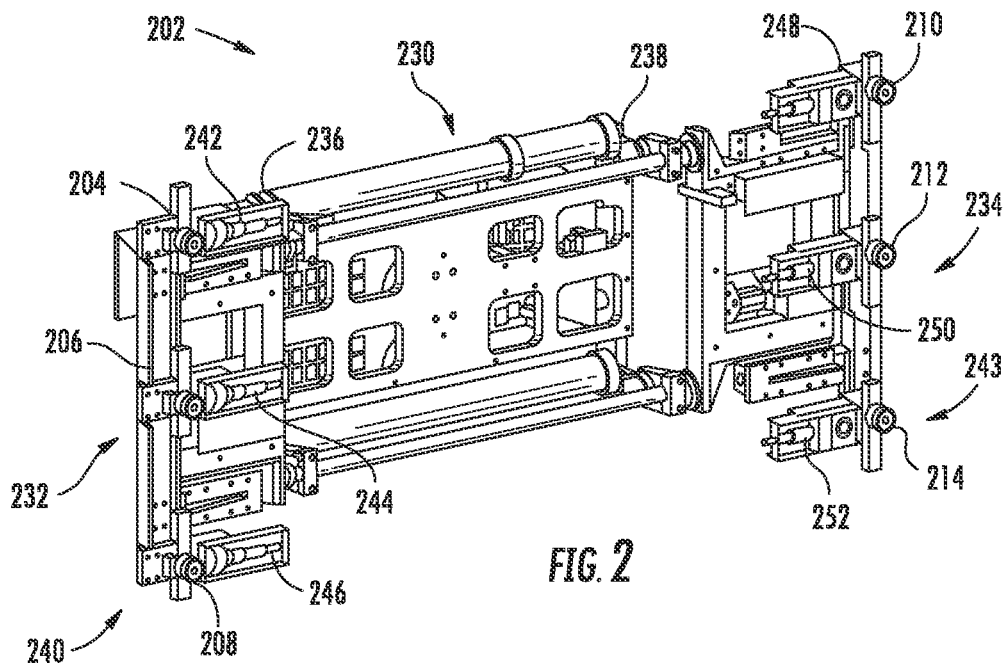
FIG. 2 is a perspective view of an embodiment of an end effector for a robot tooling for use in the system of FIG. 1.

Referring to FIG. 2, the end effector 202 is illustrated in isolation. The end effector 202 generally includes a center frame member 230 and a pair of outer frame members 232 and 234 that are supported by and located at opposite ends 236 and 238 of the center frame member 230. The outer frame members 232 and 234 are supported forward of the center frame member 230 such that the center frame member 230 is offset behind the outer frame members 232 and 234. Such an offset arrangement for the center frame member 230 can inhibit contact between the center frame member 230 and the quality area of the glass ribbon 128 during use.

Each outer frame member 232 and 234 includes a glass gripping assembly 240 and 243. Glass gripping assembly 240 includes the suction cups 204, 206 and 208 and the glass gripping assembly 243 includes the suction cups 210, 212 and 214. An actuator 242, 244, 246, 248, 250 and 252 is associated with each suction cup 204, 206, 208, 210, 212 and 214. The actuators 242, 244, 246, 248, 250 and 252 may move and/or bias their associated suction cups 204, 206, 208, 210, 212 and 214 outwardly (i.e., transverse to the long axis of the glass ribbon 128).

Figure 3:
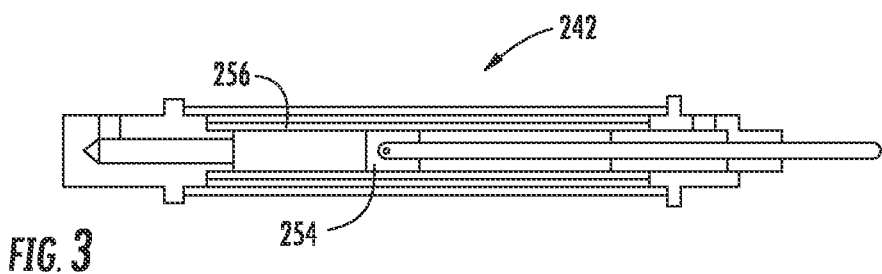
FIG. 3 is a diagrammatic section view of an embodiment of an actuator for use in the end effector of FIG. 2.

One exemplary actuator is a low friction air cylinder, such as an Airpel® cylinder commercially available from Airpot Corporation. Referring briefly to FIG. 3, the air cylinder 242 may include a precision fit graphite piston 254 which slides freely within a glass cylinder 256. Such air cylinders may be particularly suited for smooth motion at low pressures, low friction and precise force control.

Referring back to FIG. 2, the actuators 242, 244, 246, 248, 250 and 252 may move their associated suction cup 204, 206, 208, 210, 212 and 214 individually and independently from movement of the other suction cups. In other embodiments, the actuators 242, 244 and 246 of one of the outer frame members 232 may move the suction cups 204, 206 and 208 together and the actuators 248, 250 and 252 of the other of the outer frame members 234 may move the suction cups 210, 212 and 214 together. For example, the suction cups 204, 206 and 208 of the outer frame member 232 may be mounted together on a frame structure and the actuators 242, 244 and 246 may be connected to the frame structure for moving the frame structure transversely thereby moving the suction cups 204, 206 and 208 together. Any suitable arrangement may be employed for moving the suction cups 204, 206, 208, 210, 212 and 214.

In some embodiments, where low friction air cylinders are used, the cylinders may be only partly (i.e., not fully) extended when providing the tensioning force. Such an arrangement can allow for some floating of the cylinders during use. In some embodiments, intermediate actuators may be located between the low friction air cylinders and the outer frame members 232 and 234 or between the outer frame members 232 and 234 and the center frame member 230 for movement of the outer frame members 232 and 234 relative to the center frame member 230. As one example of a pre-engagement configuration, the intermediate actuators may be fully retracted and the low friction air cylinders may be fully extended. After engagement with the glass ribbon, the intermediate actuators may extend, which can force the low friction air cylinders to retract partially thus allowing floating of the suction cups 204, 206, 208, 210, 212 and 214.

Figure 4:
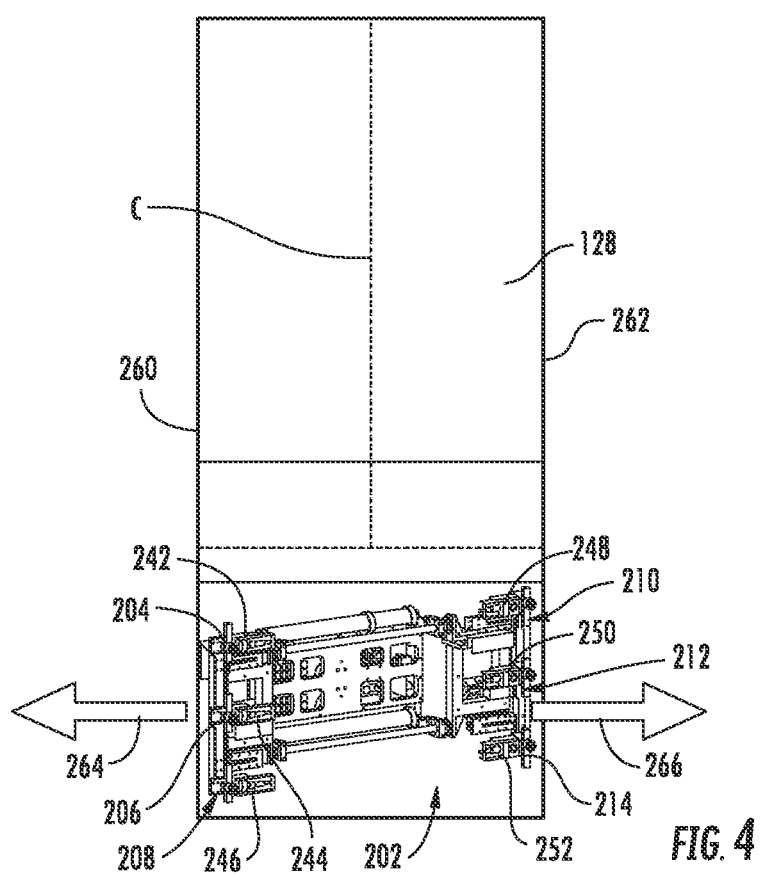
FIG. 4 is a rear view of the end effector of FIG. 2 engaged with a glass ribbon.

Referring to FIG. 4, the end effector 202 is illustrated engaged with the glass ribbon 128. Initially, the suction cups 204, 206 and 208 engage the outer edge 260 or non-quality area of the glass ribbon 128 in an unactuated configuration and the suction cups 210, 212 and 214 engage the opposite, outer edge 262 or non-quality area of the glass ribbon 128 in an unactuated configuration. Once engaged with the glass ribbon 128, the actuators 242, 244 and 246 are actuated in the direction of arrow 264 and the actuators 248, 250 and 252 are actuated in the opposite direction as indicated by arrow 266. A force is applied to the glass ribbon 128 at each of the suction cups 204, 206, 208, 210, 212 and 214 (e.g., of about 7-10 lbs.). While 7-10 lbs. of force is mentioned, more than 10 lbs. or less than 7 lbs. may be applied depending, at least in part, on the thickness of the ribbon. For example, in some instances, less force may be applied for thinner glass ribbons and more force may be applied for thicker glass ribbons. In some embodiments, the force applied at each of the outer edges 260 and 262 by the end effector 202 is each about the same magnitude of force.

In some embodiments, the force applied to the glass ribbon 128 is symmetric about the elongated axis or centerline C of the glass ribbon 128. In these embodiments, the suction cups 204, 206, 208, 210, 212 and 214 may each be equidistant from the centerline C and all apply the same or nearly the same force. It has been found that residual stress can be significantly reduced by applying the tensile force symmetrically to the glass ribbon 128 in the manner illustrated.

Figure 5:
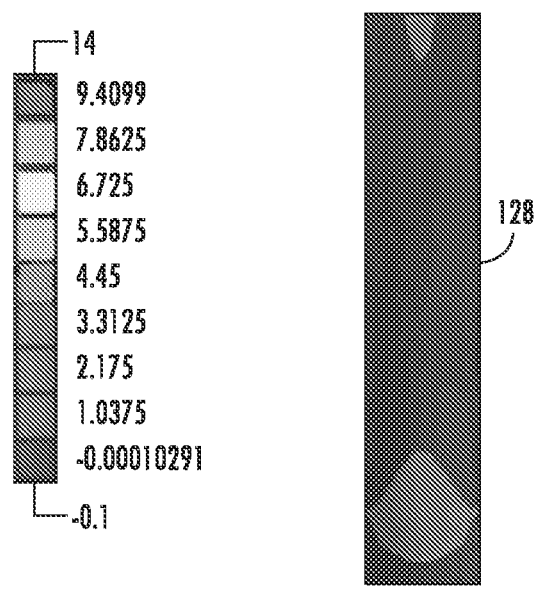
FIG. 5 illustrates a mechanical stress profile generated in the glass ribbon using the end effector of FIG. 2.
Figure 6:
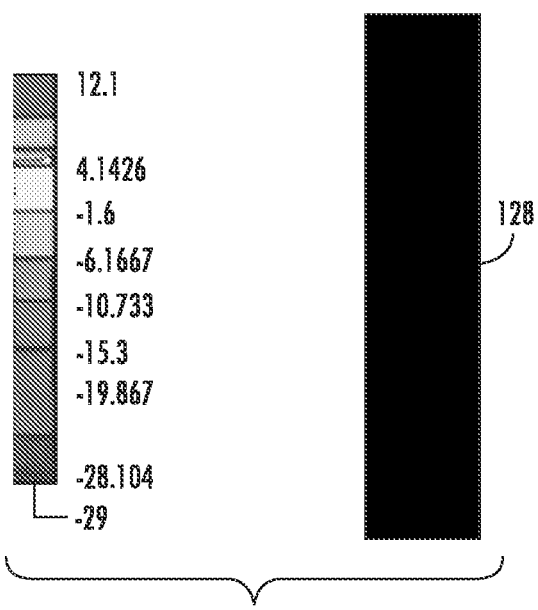
FIG. 6 illustrates a deflection profile generated in the glass ribbon using the end effector of FIG. 2.

FIG. 5 illustrates a robot tooling induced mechanical stress profile in the glass ribbon 128 resulting from symmetric application of force. As can be seen, the stress of the glass ribbon 128 is both reduced and somewhat symmetrical around the plane of the glass ribbon 128. FIG. 6 illustrates out of plane deflection of the glass ribbon 128 upon application of the symmetric application of force. As can be seen, deflection of the top part of the glass ribbon 128 is reduced and somewhat symmetrical around the plane of the glass ribbon 128. Such control of the stress and the deflection can provide enhanced precision in the formation of thinner and larger glass sheets. It, in general, can reduce the disturbance of the BOD sheet separation process when forming the glass sheet. Symmetrical tensioning can also provide a path to low residual stress for LCD glass sheets with low stiffness due to decreased thickness and increased size of the glass sheets. A more controlled separation process can also be provided, which can minimize crack formation.

Figure 7:
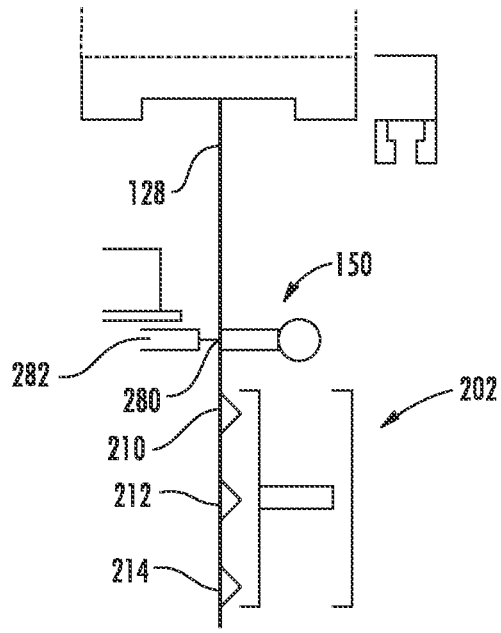
FIG. 7 is a diagrammatic illustration of an embodiment of a glass separation process using the end effector of FIG. 2.
Figure 8:
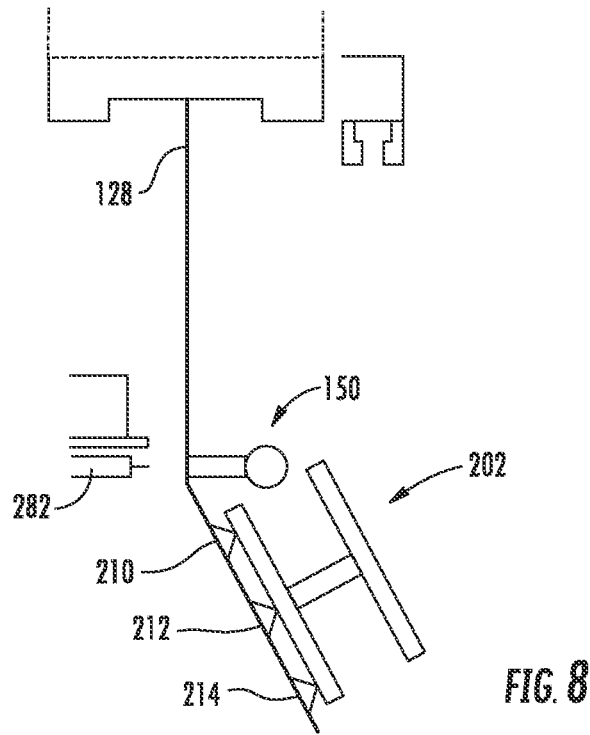
FIG. 8 is a diagrammatic illustration of an embodiment of a glass separation process using the end effector of FIG. 2.

Referring to FIGS. 7 and 8, the formation of a separation line 280 in the glass ribbon 128 may be accomplished using a scribe 282. As also shown in this figure, the suction cups 204, 206, 208, 210, 212 and 214 have engaged the glass ribbon 128 with tension being applied as described above. This engagement can take place either before or after the glass ribbon 128 has been scored.

If the engagement is done after scoring, the engagement may not create a bending moment about the score line which will cause the pane to prematurely separate from the sheet. That is, the engagement may be accomplished while maintaining the plane of the glass. A reduced bending moment during engagement can be achieved by controlling the distance between the suction cups 204, 206, 208, 210, 212 and 214 and the score line 280.

Whether the end effector 202 is engaged with the glass ribbon 128 before or after scoring, the end effector 202 may be attached to the glass ribbon 128 before the bending moment which separates the glass sheet from the glass ribbon 128 is applied. As long as the plane is maintained, the glass ribbon 128 can support substantial weight even when scored. The glass ribbon 128 loses its strength when the separation line opens up and is driven through the glass ribbon 128 by the application of a bending moment which creates a tension/compression gradient in the glass ribbon 128.

FIG. 8 illustrates the application of the bending moment. As shown, the bending moment may be applied about the first side (unscored side) of the sheet using the TAM 150 as a stop about which rotation takes place. In some embodiments, the end effector 202 immediately moves the trailing edge of the separated sheet away from the leading edge of the continually moving glass ribbon 128. In this way, any possible edge damage can be minimized.

The above-described glass handling systems and methods can be used with glasses having a variety of thicknesses, e.g., glass having a thickness on the order of approximately 0.4 mm or less. More generally, the above-described glass handling systems and methods can be used in the manufacture of any type of glass used in displays or in other applications where thin glass sheets are beneficial. Side tensioning and flattening of the ribbon may be applied so that the score wheel does not break the ribbon. In addition, sheet bending separation and transfer processes may utilize the stretched sheets to avoid breakage.

The above-described glass handling systems can subject the glass ribbon in viscoelastic and viscous states to less perturbation during scoring and separation of the glass ribbon on the production line. During glass forming process, a glass ribbon is first formed in the viscous state, which is then cooled to viscoelastic state, and then finally to elastic state. It is perturbation and stress variation in the glass ribbon in the viscous and viscoelastic states that can cause undesirable residual stress, stress distribution and shape to the final glass ribbon and cut sheet in elastic state. The glass ribbons in the elastic state may be retained in the peripheral regions by various means, such as one or more of driven stub rolls, idle stub rolls, passive edge guiding rolls, traveling suctions, traveling clamps, and the like. These additional restraining features, together with the end effectors, make it possible to score the glass ribbon, bend the glass ribbon and separate the glass ribbon.

It will be apparent to those skilled in the art that various modifications and variations can be made to the embodiments described herein without departing from the spirit and scope of the claimed subject matter. Thus, it is intended that the specification cover the modifications and variations of the various embodiments described herein, provided such modification and variations come within the scope of the appended claims and their equivalents.

What is claimed is:

1. A method for engaging and tensioning a glass ribbon, the method comprising:
   engaging the glass ribbon using an end effector of a robot tooling, the end effector comprising:
   a center frame member;
   a first outer frame member connected to the center frame member, the first outer frame member including at least a first suction cup engaging an edge area of the glass ribbon and an actuator for moving the at least first suction cup of the first outer frame member; and a second outer frame member connected to the center frame member, the second outer frame member including at least a second suction cup engaging an opposite edge area of the glass ribbon and an actuator for moving the at least second suction cup of the second outer frame member;

applying a first tensioning force to the glass ribbon at the at least first suction cup of the first outer frame member by actuating the actuator of the first outer frame member; and applying a second tensioning force to the glass ribbon at the at least second suction cup of the second outer frame member by actuating the actuator of the second outer frame member.

2. The method of claim 1, wherein the first tensioning force and the second tensioning force have about the same magnitude and are applied simultaneously.

3. The method of claim 1, wherein the first tensioning force is in a direction that is opposite a direction of the second tensioning force.

4. The method of claim 1, wherein at least one of the first tensioning force and the second tensioning force is between about 7 and about 10 lbs.

5. The method of claim 1, wherein the first outer frame member comprises a plurality of first suction cups engaging the edge area of the glass ribbon and the second outer frame member comprises a plurality of second suction cups engaging the opposite edge area of the glass ribbon.

6. The method of claim 5, wherein the first outer frame member comprises a plurality of actuators, where each actuator of the first outer frame member is connected to a respective suction cup of the plurality of first suction cups of the first outer frame member.

7. The method of claim 6, wherein the second outer frame member comprises a plurality of actuators, where each actuator of the second outer frame member is connected to a respective suction cup of the plurality of second suction cups of the second outer frame member.

8. The method of claim 1, wherein the actuator is an air cylinder.

9. A method for making a glass sheet comprising the following steps:
(A) forming a glass ribbon in a viscoelastic state;
(B) drawing the glass ribbon in the viscoelastic state;
(C) cooling the glass ribbon in the viscous state into an elastic state;
(D) engaging the glass ribbon using an end effector of a robot tooling, the end effector comprising:
  a center frame member;
  a first outer frame member connected to the center frame member, the first outer frame member including at least a first suction cup engaging an edge area of the glass ribbon and an actuator for moving the at least first suction cup of the first outer frame member; and
  a second outer frame member connected to the center frame member, the second outer frame member including at least a second suction cup engaging an opposite edge area of the glass ribbon and an actuator for moving the at least second suction cup of the second outer frame member;
(E) applying a first tensioning force to the glass ribbon at the at least first suction cup of the first outer frame member by actuating the actuator of the first outer frame member;
(F) applying a second tensioning force to the glass ribbon at the at least second suction cup of the second outer frame member by actuating the actuator of the second outer frame member;
(G) scoring the glass ribbon in the elastic state along a line transversal to the direction in which the glass ribbon is drawn to form a transversal score-line; and
(H) after step (G), separating a glass sheet from the glass ribbon along the transversal score-line.

10. The method of claim 9, wherein steps (E) and (F) are carried out substantially simultaneously, and the first tensioning force and the second tensioning force are substantially equal in magnitude and opposite in direction.

11. The method of claim 9, wherein step (H) comprises bending the glass ribbon along the transversal score-line using the end-effector.

12. The method of claim 9, wherein step (A) comprises a step of fusion down-draw, slot down-draw, or redraw down-draw.

13. The method of claim 10, wherein the first tensioning force and the second tensioning force are from 7 lb to 10 lb.

14. The method of claim 10, wherein before step (D), the glass ribbon in the elastic state above the score-line is further restrained in the peripheral regions of both sides by edge restraining devices.

* * * * *